Dec. 2, 1924.
J. T. ERWIN
SIGNAL
Filed March 7, 1924
1,517,831
2 Sheets-Sheet 1
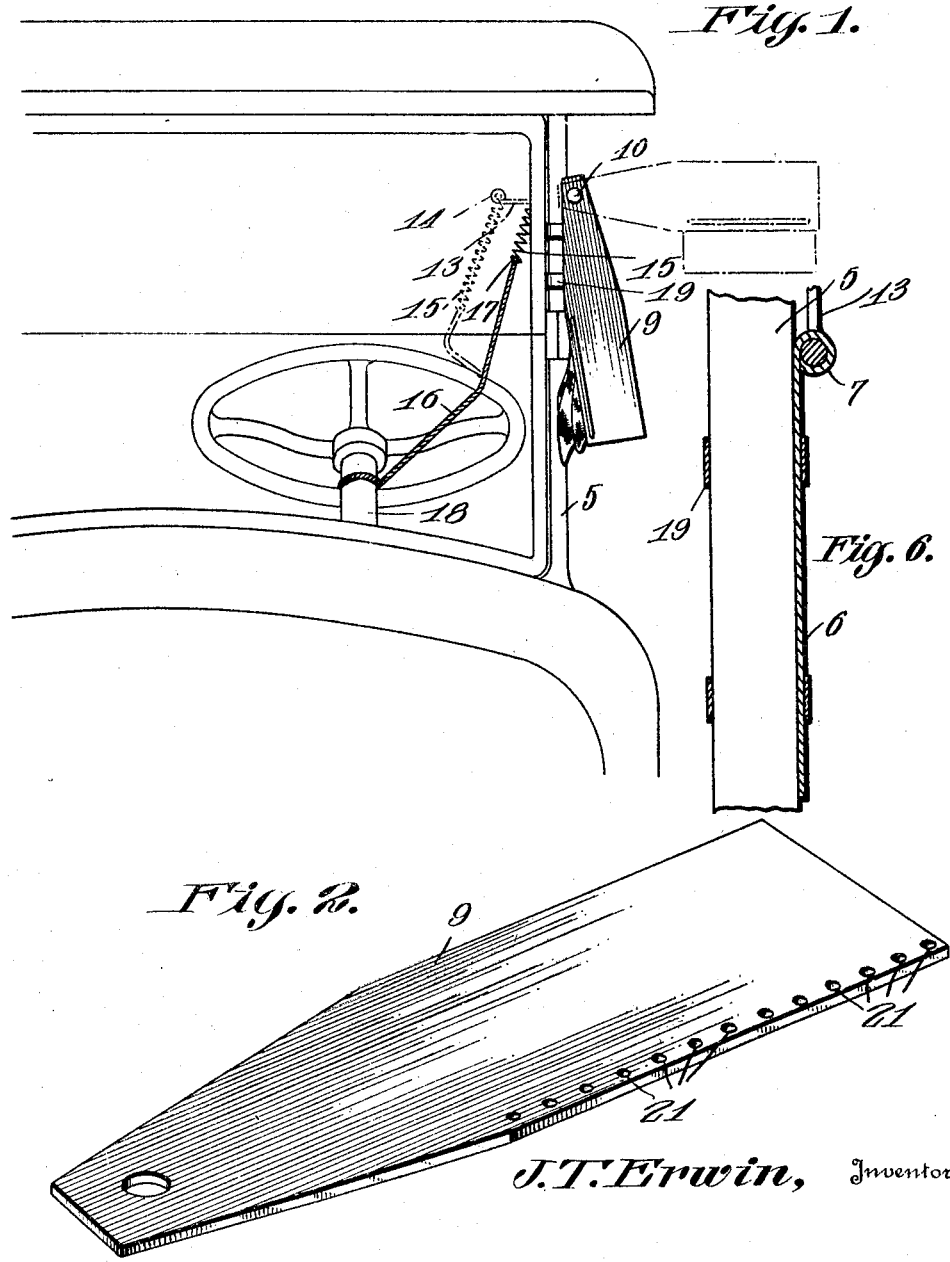

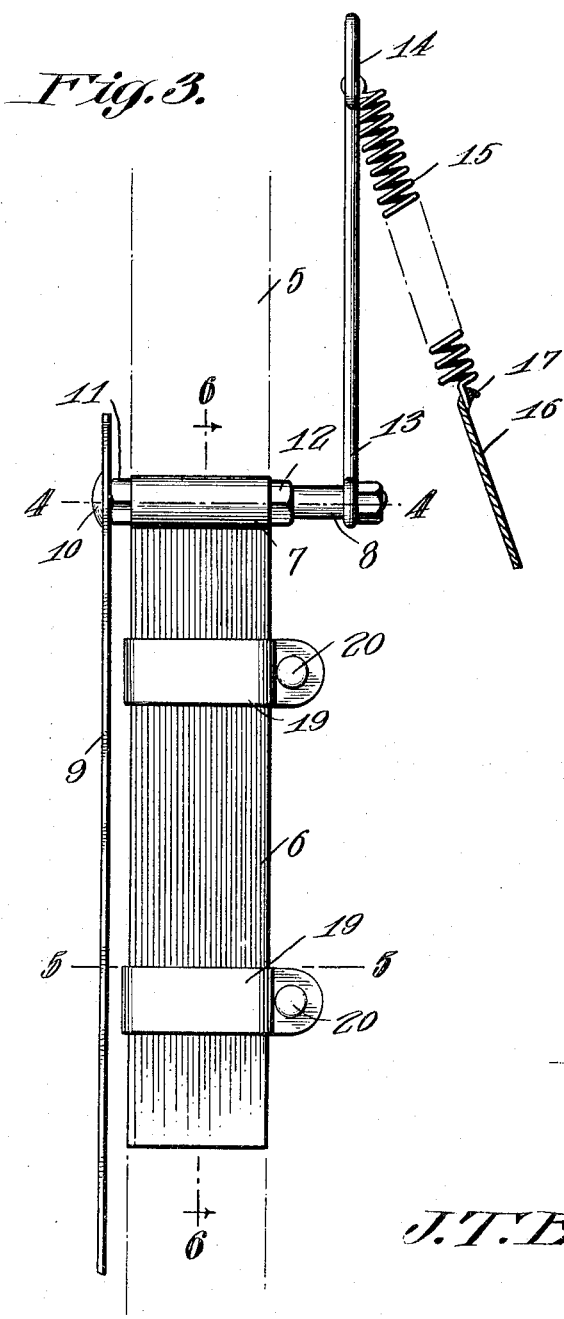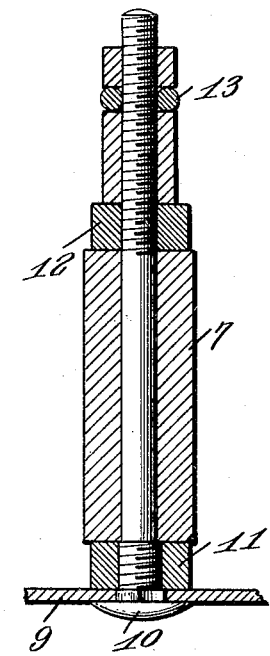

Patented Dec. 2, 1924.

UNITED STATES PATENT OFFICE.

JOHN THOMAS ERWIN, OF TEAGUE, TEXAS.

SIGNAL.

Application filed March 7, 1924. Serial No. 697,593.

*To all whom it may concern:*

Be it known that I, JOHN THOMAS ERWIN, a citizen of the United States, residing at Teague, in the county of Freestone and State of Texas, have invented a new and useful Signal, of which the following is a specification.

This invention relates to signaling devices especially designed for use on motor vehicles, the primary object of the invention being to provide a signaling device which may be readily and easily operated by the person driving the vehicle to warn persons passing in proximity to the vehicle supplied with the signaling device, of the movements of the vehicle.

Another important object of the invention is to provide a device of this character which may be readily and easily installed on motor vehicles, eliminating the necessity of making alterations in the vehicle construction to apply the same.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is an elevational view disclosing a signaling device constructed in accordance with the invention as mounted on a motor vehicle windshield frame, the signal being indicated by dotted lines as in its active position.

Figure 2 is a perspective view of the signal paddle.

Figure 3 is a side elevational view of the signaling device.

Figure 4 is a sectional view taken on line 4—4 of Figure 3, and

Figure 5 is a sectional view taken on line 5—5 of Figure 3.

Figure 6 is a section on line 6—6 of Figure 3.

Referring to the drawings in detail, the reference character 5 designates the usual supporting bars of a motor vehicle windshield frame, to which the signaling device forming the essence of the invention, is secured.

The device includes a relatively wide metallic supporting member 6 which has its upper end bent inwardly to provide a bearing 7 to accommodate the shaft 8 on which the paddle 9 or signaling arm is mounted. The shaft 8 is formed with a head 10 and is supplied with a nut 11 between which nut and head the paddle 9 is positioned in a manner to grip the paddle and cause the paddle to move with the shaft 8 when it is rotated, in its bearing.

A nut 12 is also mounted on the shaft 8 and engages one end of the bearing 7 to hold the shaft against longitudinal movement through the bearing member 7 and insure a true rotary movement of the shaft, when the operating means to be hereinafter more fully described is operated.

Secured on one end of the shaft 8 to move therewith is an arm 13 formed with an eye 14 at one of its ends, which eye accommodates one end of the coiled spring 15, the opposite end of the coiled spring having connection with the flexible member 16 at 17. This flexible member 16 has one of its ends secured to the steering post 18 of the vehicle so that the flexible member 16 lies in proximity to the steering wheel mounted at one end of the steering post so that the operator will have easy access thereto to manipulate the signal.

In order that the device may be secured against movement securing straps 19 are provided, which straps embrace portions of the supporting bar of the windshield frame to which the device is secured, the ends of the straps being bolted together at 20.

The paddle or blade 9 is formed with a plurality of openings 21 disposed in spaced relation with each other, which openings accommodate a suitable securing means 22 for securing the flag 23 thereto, which flag is adapted to hang downwardly in a position as indicated in dotted lines in Figure 1 to attract the attention of persons moving in proximity to the signaling device.

From the foregoing it will be obvious that when the operator wishes to turn, the operator places one of his fingers over the flexible member 16 pulling the same, whereupon the paddle of the signal is moved to its active position. When the flexible member 16 is released, the weight of the paddle is sufficient to return it to its initial position.

I claim:—

1. In a device of the character described, a supporting member including a metallic member having its upper end bent inwardly to provide a bearing, a shaft extending through the bearing, a paddle secured to the shaft to move therewith, an arm on the opposite end of the shaft, a flexible member having connection with the arm, a flexible member secured to the arm, said flexible member adapted to lie in proximity to the steering wheel of a motor vehicle, and means carried by the paddle for attracting attention thereto.

2. In a device of the character described, a supporting member having a bearing at its upper end, a shaft extending through the bearing, said shaft having a head, a nut on the shaft and operating in proximity to the head, a paddle positioned on the shaft and disposed between the nut and the head to hold the paddle to the shaft, means for restricting movement of the shaft longitudinally of the bearing, an arm connected with the shaft, means having connection with the arm for moving the arm to move the shaft and paddle, and securing straps adapted to embrace a portion of the supporting member to secure the supporting member to a support.

In testimony that I claim the foregoing as my own, I have hereto affixed my signature in the presence of two witnesses.

JOHN THOMAS ERWIN.

Witnesses:
J. W. RHU,
J. F. MARTIN.